(12) United States Patent
Nakada et al.

(10) Patent No.: US 10,392,981 B2
(45) Date of Patent: Aug. 27, 2019

(54) EXHAUST PURIFICATION SYSTEM, AND CONTROL METHOD FOR EXHAUST PURIFICATION SYSTEM

(71) Applicant: ISUZU MOTORS LIMITED, Tokyo (JP)

(72) Inventors: Teruo Nakada, Yokohama (JP);
Takayuki Sakamoto, Fujisawa (JP);
Daiji Nagaoka, Kamakura (JP);
Hiroyuki Yuza, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 47 days.

(21) Appl. No.: 15/557,459

(22) PCT Filed: Mar. 9, 2016

(86) PCT No.: PCT/JP2016/057379
§ 371 (c)(1),
(2) Date: Sep. 11, 2017

(87) PCT Pub. No.: WO2016/143822
PCT Pub. Date: Sep. 15, 2016

(65) Prior Publication Data
US 2018/0066557 A1    Mar. 8, 2018

(30) Foreign Application Priority Data
Mar. 11, 2015 (JP) .................. 2015-048307

(51) Int. Cl.
*F01N 3/08* (2006.01)
*F01N 3/10* (2006.01)
(Continued)

(52) U.S. Cl.
CPC ........... *F01N 3/20* (2013.01); *B01D 53/9409* (2013.01); *B01D 53/9495* (2013.01);
(Continued)

(58) Field of Classification Search
CPC . B01D 53/9409; B01D 53/9495; F01N 3/021; F01N 3/0814; F01N 3/0842;
(Continued)

(56) References Cited

U.S. PATENT DOCUMENTS

| 7,054,734 B2 | 5/2006 | Todoroki et al. |
| 2005/0027431 A1 | 2/2005 | Todoroki et al. |

(Continued)

FOREIGN PATENT DOCUMENTS

| EP | 2148054 A1 | 1/2010 |
| EP | 3249186 A1 | 11/2017 |

(Continued)

OTHER PUBLICATIONS

International Search Report and Written Opinion for PCT App No. PCT/JP2016/057379 dated Jun. 7, 2016, 9 pgs.

(Continued)

*Primary Examiner* — Brandon D Lee
(74) *Attorney, Agent, or Firm* — Procopio, Cory, Hargreaves & Savitch LLP

(57) ABSTRACT

The embodiments include: a NOx occlusion/reduction catalyst which is provided to an exhaust passage of an internal combustion engine, occludes NOx in exhaust when the exhaust is in a lean state, and reduces and purifies occluded NOx when the exhaust is in a rich state; a NOx purging control unit which, when the exhaust is in the rich state, executes NOx purging in which the NOx occluded in the NOx occlusion/reduction catalyst is reduced and purified; and a NOx-purging-prohibition processing unit which, when at least one of a plurality of prohibition conditions is fulfilled, prohibits execution of catalyst regeneration processing by the NOx purging control unit even if a catalyst-regeneration-processing start request has been issued, and, when one of the prohibition conditions is fulfilled during (Continued)

execution of the catalyst regeneration processing, invalidates the prohibition condition and allows continued execution of the catalyst regeneration processing by the NOx purging control unit.

7 Claims, 7 Drawing Sheets

(51) Int. Cl.
| | |
|---|---|
| *F01N 3/20* | (2006.01) |
| *F01N 3/36* | (2006.01) |
| *F01N 9/00* | (2006.01) |
| *B01D 53/94* | (2006.01) |
| *F01N 3/021* | (2006.01) |
| *F02D 41/00* | (2006.01) |
| *F02D 41/02* | (2006.01) |
| *F02D 41/04* | (2006.01) |
| *F02D 41/12* | (2006.01) |
| *F02D 41/14* | (2006.01) |
| *F02D 41/18* | (2006.01) |
| *F02D 41/22* | (2006.01) |
| *F02D 41/24* | (2006.01) |
| *F02D 41/40* | (2006.01) |

(52) U.S. Cl.
CPC ........... *F01N 3/021* (2013.01); *F01N 3/0814* (2013.01); *F01N 3/0842* (2013.01); *F01N 3/0871* (2013.01); *F01N 3/103* (2013.01); *F01N 9/00* (2013.01); *F02D 41/0275* (2013.01); *F01N 3/36* (2013.01); *F01N 2430/06* (2013.01); *F01N 2570/14* (2013.01); *F01N 2610/03* (2013.01); *F02D 41/0007* (2013.01); *F02D 41/0235* (2013.01); *F02D 41/04* (2013.01); *F02D 41/123* (2013.01); *F02D 41/1454* (2013.01); *F02D 41/1458* (2013.01); *F02D 41/1463* (2013.01); *F02D 41/1495* (2013.01); *F02D 41/182* (2013.01); *F02D 41/22* (2013.01); *F02D 41/2448* (2013.01); *F02D 41/2454* (2013.01); *F02D 41/405* (2013.01); *F02D 2200/0614* (2013.01); *F02D 2200/0802* (2013.01); *F02D 2200/101* (2013.01); *F02D 2200/602* (2013.01); *Y02T 10/47* (2013.01)

(58) Field of Classification Search
CPC .......... F01N 3/0871; F01N 3/103; F01N 3/20; F01N 9/00; F01N 2430/06; F01N 2570/14; F01N 2610/03; F01N 3/36; F02D 41/0275; F02D 2200/0614; F02D 2200/0802; F02D 2200/101; F02D 2200/602; F02D 41/0007; F02D 41/0235; F02D 41/04; F02D 41/123; F02D 41/1454; F02D 41/1458; F02D 41/1463; F02D 41/1495; F02D 41/182; F02D 41/22; F02D 41/2448; F02D 41/2454; F02D 41/405; Y02T 10/47

See application file for complete search history.

(56) References Cited

U.S. PATENT DOCUMENTS

| | | |
|---|---|---|
| 2008/0314031 A1 | 12/2008 | Shamis et al. |
| 2010/0101217 A1 | 4/2010 | Ohashi et al. |
| 2011/0023455 A1* | 2/2011 | Lee .................. F01N 3/105 60/274 |
| 2012/0180454 A1 | 7/2012 | Argolini et al. |

FOREIGN PATENT DOCUMENTS

| | | |
|---|---|---|
| JP | 2004-308525 A | 11/2004 |
| JP | 2005-105828 A | 4/2005 |
| JP | 2007-016713 A | 1/2007 |
| JP | 2007-107474 A | 4/2007 |
| JP | 2008-202425 A | 9/2008 |
| JP | 2008-231927 A | 10/2008 |
| JP | 2012-214059 A | 11/2012 |

OTHER PUBLICATIONS

Office Action for related CN App No. 201680014834.5 dated Feb. 3, 2019, 17 pgs.
Supplementary Partial European Search Report for related European Application No. EP16761789 dated Dec. 17, 2018; 15 pages.

* cited by examiner

EXHAUST PURIFICATION SYSTEM, AND CONTROL METHOD FOR EXHAUST PURIFICATION SYSTEM

CROSS-REFERENCE TO RELATED APPLICATIONS

This application is a U.S. National Stage entry of PCT Application No. PCT/JP2016/057379, filed on Mar. 9, 2016, which claims priority to Japanese Patent Application No. 2015-048307, filed Mar. 11, 2015, the contents of which are incorporated herein by reference.

TECHNICAL FIELD

The present invention relates to an exhaust purification system and a control method of an exhaust purification system.

RELATED ART

In the related art, NOx-occlusion-reduction-type catalyst has been known, as catalyst for reducing and purifying nitrogen compound (NOx) in exhaust to be emitted from an internal combustion engine. When the exhaust is in a lean atmosphere, the NOx-occlusion-reduction-type catalyst occludes NOx contained in the exhaust, and when the exhaust is in a rich atmosphere, the NOx-occlusion-reduction-type catalyst detoxifies and releases the occluded NOx with hydrocarbon contained in the exhaust by reduction and purification. For this reason, when a NOx occlusion amount of the catalyst reaches a predetermined amount, it is necessary to periodically perform NOx purge of enriching the exhaust by exhaust pipe injection or post injection so as to recover a NOx occlusion capacity (for example, refer to Patent Documents 1 and 2).

CITATION LIST

Patent Documents

Patent Document 1: Japanese Patent Application Publication No. 2008-202425A
Patent Document 2: Japanese Patent Application Publication No. 2007-16713A

SUMMARY OF THE INVENTION

Problems to be Solved

When an engine fuel injection amount is small, an exhaust lambda (an air excess ratio of the exhaust) is maintained high. However, even when the NOx purge is executed at the state where the exhaust lambda is maintained high, it is not possible to lower the exhaust lambda to a desired lambda necessary for NOx purge, so that the fuel consumption is deteriorated due to useless exhaust pipe injection or post injection.

In order solve the above problem, it is considered to set a prohibition condition and to prohibit the execution of NOx purge even though a catalyst regeneration processing start request is issued, if the prohibition condition is fulfilled. However, when the prohibition condition is strictly applied, as the prohibition condition is fulfilled, the NOx purge is stopped even when the NOx purge is being executed, and the exhaust pipe injection or post injection, which has been performed until then, comes to nothing, so that the fuel consumption is rather deteriorated.

An exhaust purification system and a control method of an exhaust purification system of the disclosure are to effectively prevent deterioration in fuel consumption by regulating execution and prohibition of NOx purge.

Means For Solving Problems

A system of the disclosure includes a NOx-occlusion-reduction-type catalyst that is provided in an exhaust system of an internal combustion engine and occludes NOx in exhaust flowing in the exhaust system when the exhaust is in a lean state and reduces and purifies the occluded NOx when the exhaust is in a rich state; and
a controller configured to execute
a catalyst regeneration processing executing process for executing catalyst regeneration processing of enriching the exhaust and reducing and purifying the NOx occluded in the NOx-occlusion-reduction-type catalyst;
a prohibition process for, when at least one of a plurality of prohibition conditions is fulfilled, prohibiting execution of the catalyst regeneration processing by the catalyst regeneration process even when a catalyst regeneration processing start request is issued, and
a continuing process for, when a specific prohibition condition, which is a part of the plurality of prohibition conditions, is fulfilled during the execution of the catalyst regeneration processing, invalidating the prohibition process and continuing the catalyst regeneration processing by the catalyst regeneration process.

Also, a control method of an exhaust purification system of the disclosure is a control method of an exhaust purification system including a NOx-occlusion-reduction-type catalyst that is provided in an exhaust system of an internal combustion engine and occludes NOx in exhaust flowing in the exhaust system when the exhaust is in a lean state and reduces and purifies the occluded NOx when the exhaust is in a rich state, the control method including:
catalyst regeneration processing of enriching the exhaust and reducing and purifying the NOx occluded in the NOx-occlusion-reduction-type catalyst,
prohibition processing of, when at least one of a plurality of prohibition conditions is fulfilled, prohibiting execution of the catalyst regeneration processing even though a catalyst regeneration processing start request is issued, and
continuing processing of, when a specific prohibition condition, which is a part of the plurality of prohibition conditions, is fulfilled during the execution of the catalyst regeneration processing, continuing the catalyst regeneration processing without executing the prohibition processing.

Effects of the Invention

According to the exhaust purification system and the control method of an exhaust purification system of the disclosure, the execution and prohibition of NOx purge are regulated, so that it is possible to effectively prevent deterioration in fuel consumption.

DETAILED DESCRIPTION OF PREFERRED ILLUSTRATIVE EMBODIMENTS

Hereinafter, an exhaust purification system and the control method of an exhaust purification system in accordance with an illustrative embodiment of the disclosure will be described with reference to the accompanying drawings.

Figure 1:
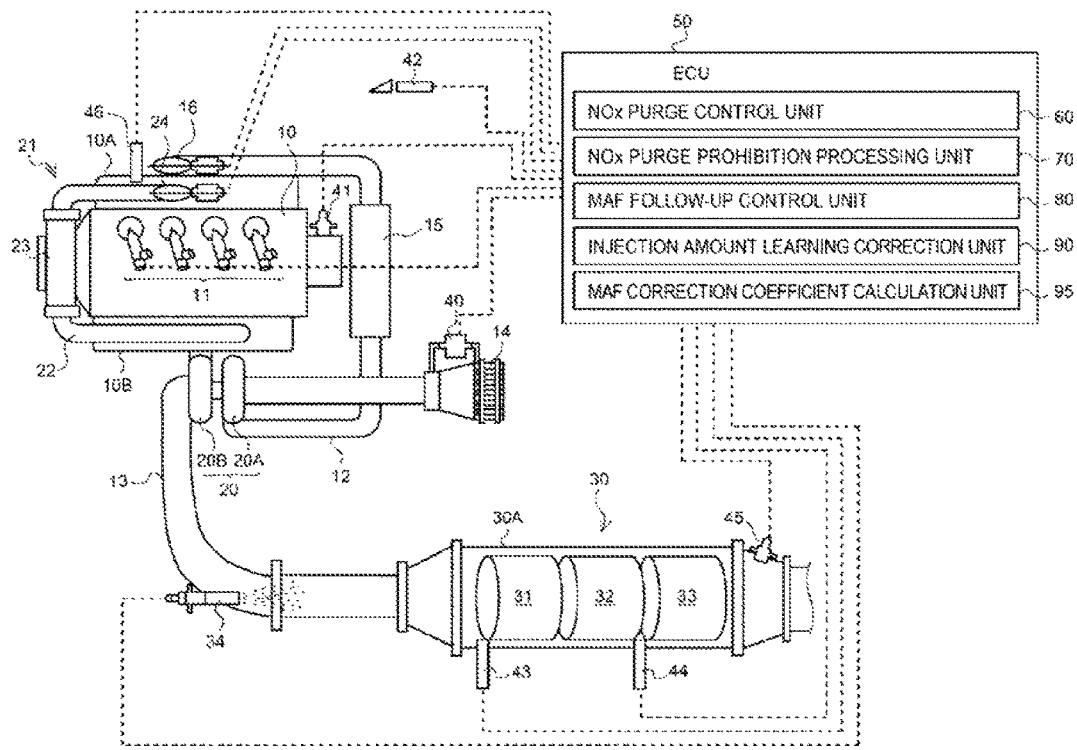
FIG. 1 is an overall configuration view depicting an exhaust purification system in accordance with an illustrative embodiment.

As shown in FIG. 1, each cylinder of a Diesel engine (hereinafter, simply referred to as 'engine') 10 is provided with an in-cylinder injector 11 configured to directly inject high-pressure fuel accumulated to a common rail (not shown) into each cylinder. A fuel injection amount and fuel injection timing of each in-cylinder injector 11 are controlled in correspondence to instruction signals that are input from an electronic control unit (hereinafter, referred to as 'ECU') 50.

An intake manifold 10A of the engine 10 is connected with an intake passage 12 for introducing therein fresh air, and an exhaust manifold 10B is connected with an exhaust passage 13 for discharging exhaust to an outside. The intake passage 12 is provided with an air cleaner 14, an intake air amount sensor (hereinafter, referred to as 'MAF sensor') 40, a compressor 20A of a variable capacity-type supercharger 20, an intercooler 15, an intake throttle valve 16 and the like, in corresponding order from an intake upstream side. The exhaust passage 13 is provided with a turbine 20B of the variable capacity-type supercharger 20, an exhaust alter-treatment device 30 and the like, in corresponding order from an exhaust upstream side. In the meantime, the engine 10 is mounted with an engine revolution sensor 41, an accelerator opening degree sensor 42 and a boost pressure sensor 46.

In the description of the illustrative embodiment, the MAF sensor 40 configured to measure and detect a mass flow rate (Mass Air Flow) is used as the intake air amount sensor configured to measure and detect an intake air amount (intake flow rate (Suction Air Flow)) of the engine. However, a flow rate (Air Flow) sensor different from the MAF sensor 40 or a means replacing the flow rate sensor can also be used inasmuch as it can measure and detect the intake flow rate of the engine.

An EGR (Exhaust Gas Recirculation) device 21 includes an EGR passage 22 configured to connect the exhaust manifold 10B and the intake manifold 10A each other, an EGR cooler 23 configured to cool an EGR gas, and an EGR valve 24 configured to regulate an EGR amount.

The exhaust after-treatment device 30 includes an oxidation catalyst 31, a NOx-occlusion-reduction-type catalyst 32 and a particulate filter (hereinafter, simply referred to as 'filter') 33, which are arranged in a case 30A in corresponding order from the exhaust upstream side. Also, the exhaust passage 13 positioned further upstream than the oxidation catalyst 31 is provided with an exhaust injector 34 configured to inject unburnt fuel (mainly, hydrocarbon (HC)) into the exhaust passage 13 in correspondence to an instruction signal input from the ECU 50.

The oxidation catalyst 31 is formed by carrying an oxidation catalyst component on a surface of a ceramic carrier such as a honeycomb structure, for example. When the unburnt fuel is supplied by exhaust pipe injection of the exhaust injector 34 or post injection of the in-cylinder injector 11, the oxidation catalyst 31 oxidizes the same to increase an exhaust temperature.

The NOx-occlusion-reduction-type catalyst 32 is formed by carrying alkali metal or the like on a surface of a ceramic carrier such as a honeycomb structure, for example. The NOx-occlusion-reduction-type catalyst 32 occludes NOx in the exhaust when the exhaust air-fuel ratio is in a lean state, and reduces and purifies the occluded NOx with a reducing agent (HC or the like) included in the exhaust when the exhaust air-fuel ratio is in a rich state.

The filter 33 is formed by arranging a plurality of cells, which are divided by a porous partition wall, along a flowing direction of the exhaust and alternately plugging upstream and downstream sides of the cells, for example. The filter 33 is configured to trap particulate matters (PM) in the exhaust in fine holes or surfaces of the partition wall, and when an estimated accumulation amount of the PM reaches a predetermined amount, so-called filter forced regeneration of combusting and removing the accumulated PM is executed. The filter forced regeneration is performed by supplying the unburnt fuel to the upstream oxidation catalyst 31 by the exhaust pipe injection or the post injection and increasing a temperature of the exhaust to be introduced to the filter 33 to a PM combustion temperature.

A first exhaust temperature sensor 43 is provided further upstream than the oxidation catalyst 31 and is configured to detect a temperature of the exhaust to be introduced into the oxidation catalyst 31. A second exhaust temperature sensor 44 is provided between the NOx-occlusion-reduction-type catalyst 32 and the filter 33, and is configured to detect a temperature of the exhaust to be introduced into the filter 33. A NOx/lambda sensor 45 is provided further downstream than the filter 33, and is configured to detect a NOx value and a lambda value (hereinafter, referred to as 'air excess ratio') of the exhaust having passed through the NOx-occlusion-reduction-type catalyst 32.

The ECU 50 is configured to perform a variety of controls of the engine 10 and the like and includes a CPU, a ROM, a RAM, an input port, an output port and the like, which are well known. In order to perform the diverse controls, the ECU 50 is input with sensor values of the sensors 40 to 45. Also, the ECU 50 has, as some functional elements, a NOx purge control unit 60, a NOx purge prohibition processing unit 70, an MAF follow-up control unit 80, an injection amount learning correction unit 90 and an MAF correction coefficient calculation unit 95. The functional elements are included in the ECU 50, which is the integral hardware. However, some of the functional elements may be provided in separate hardware.

[NOx Purge Control]

The NOx purge control unit 60 is the catalyst regeneration means of the disclosure, and is configured to execute catalyst regeneration processing of enriching the exhaust and detoxifying and releasing NOx, which is occluded in the NOx-occlusion-reduction-type catalyst 32, by reduction and purification, thereby recovering a NOx occlusion capacity of the NOx-occlusion-reduction-type catalyst 32 (hereinafter, the control is referred to as 'NOx purge control').

A "start request" of the NOx purge control is established when a NOx emission amount per unit time is estimated from an operating state of the engine 10 and an estimated cumulative value ΣNOx obtained by cumulatively calculating the emission amounts exceeds a predetermined threshold value or when a NOx conversion efficiency by the NOx-occlusion-reduction-type catalyst 32 is calculated from a NOx emission amount of a catalyst upstream side, which is estimated from the operating state of the engine 10, and a NOx amount of a catalyst downstream side, which is detected by the NOx/lambda sensor 45, and the NOx conversion efficiency becomes below a predetermined determination threshold value. When "start request" is established at a state where a prohibition flag $F_{Pro\_NP}$ (which will be described later in detail) is off ($F_{NP}=0$), a NOx purge flat $F_{NP}$ for executing the NOx purge control becomes on ($F_{NP}=1$) (refer to time $t_1$ in FIG. 2).

In the illustrative embodiment, the enriching of the exhaust by the NOx purge control is implemented by concurrently using NOx purge lean control of lowering an air excess ratio from a value (for example, about 1.5) upon normal operation to a first target air excess ratio (for example, about 1.3) closer to a lean side than a theoretical air-fuel ratio equivalent value (for example, about 1.0) by air system control and NOx purge rich control of lowering the air excess ratio from the first target air excess ratio to a second target air excess ratio (for example, about 0.9) of a rich side by injection system control. Hereinafter, the NOx purge lean control and the NOx purge rich control are described in detail.

[NOx Purge Lean Control]

Figure 3:
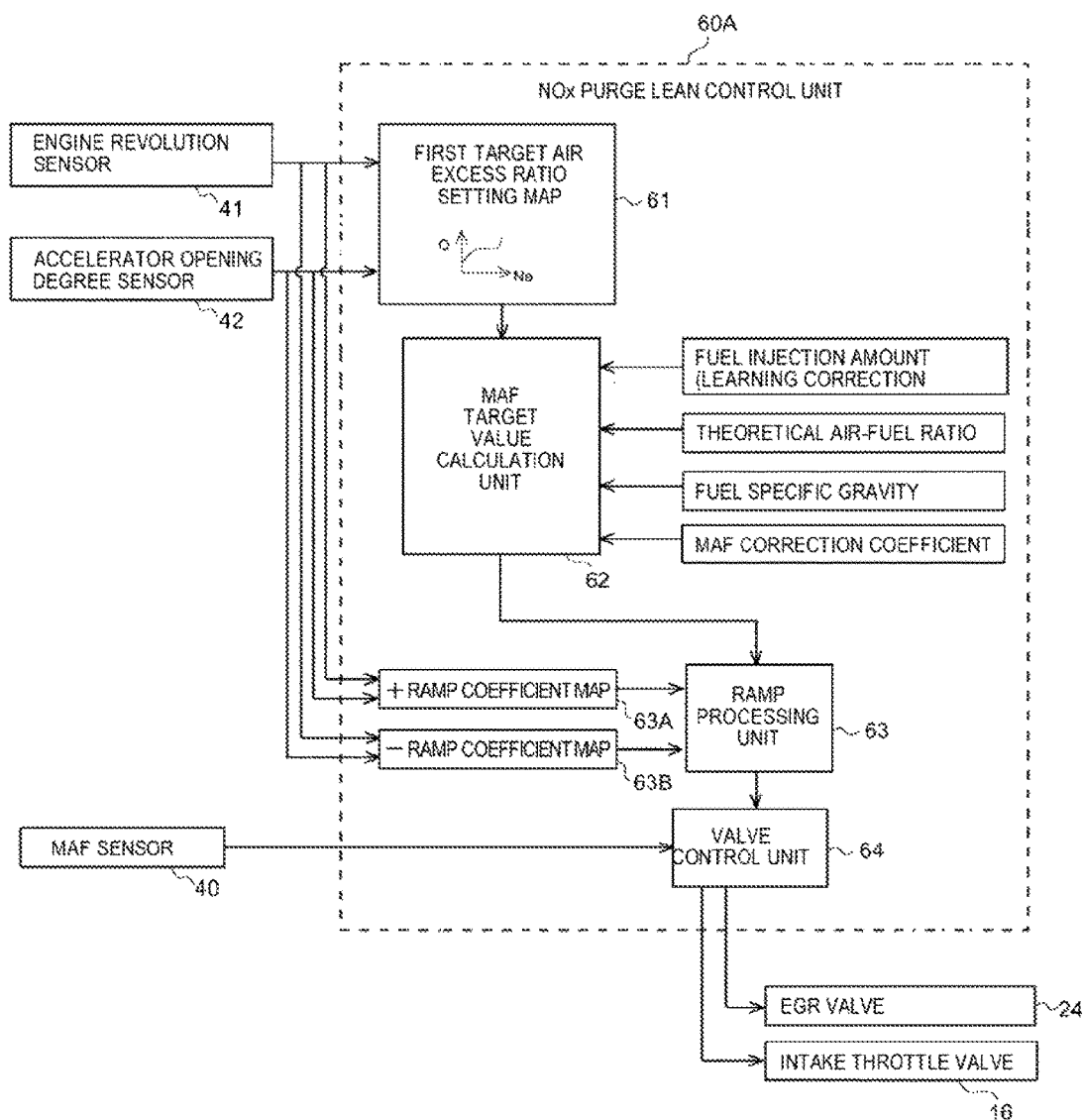
FIG. 3 is a block diagram depicting setting processing of an MAF target value that is to be used for NOx purge lean control in accordance with the illustrative embodiment.

FIG. 3 is a block diagram depicting setting processing of an MAF target value $MAF_{NPL\_Trgt}$ that is to be performed by a NOx purge lean control unit 60A. A first target air excess ratio setting map 61 is a map that is to be referred to on the basis of an engine revolution Ne and an accelerator opening degree Q, and an air excess ratio target value $\lambda_{NPL\_Trgt}$ (first target air excess ratio) upon NOx purge lean control corresponding to the engine revolution Ne and the accelerator opening degree Q is set in advance by a test and the like.

First, the air excess ratio target value $\lambda_{NPL\_Trgt}$ upon NOx purge lean control is read from the first target air excess ratio setting map 61, in response to the engine revolution Ne and the accelerator opening degree Q, which are input signals, and is then input to an MAF target value calculation unit 62. Also, the MAF target value calculation unit 62 calculates an MAF target value $MAF_{NPL\_Trgt}$ upon NOx purge lean control, based on an equation (1).

$$MAF_{NPL\_Trgt}=\lambda_{NPL\_Trgt} \times Q_{fnl\_cord} \times Ro_{Fuel} \times AFR_{sto}/Maf\_corr \quad (1)$$

In the equation (1), $Q_{fnl\_cord}$ indicates a fuel injection amount (the post injection is excluded) of the in-cylinder injector 11, which has been learning-corrected (which will be described later), $Ro_{Fuel}$ indicates a fuel specific gravity, $AFR_{sto}$ to indicates a theoretical air-fuel ratio, and $Maf\_corr$ indicates an MAF correction coefficient (which will be described later).

Figure 2:
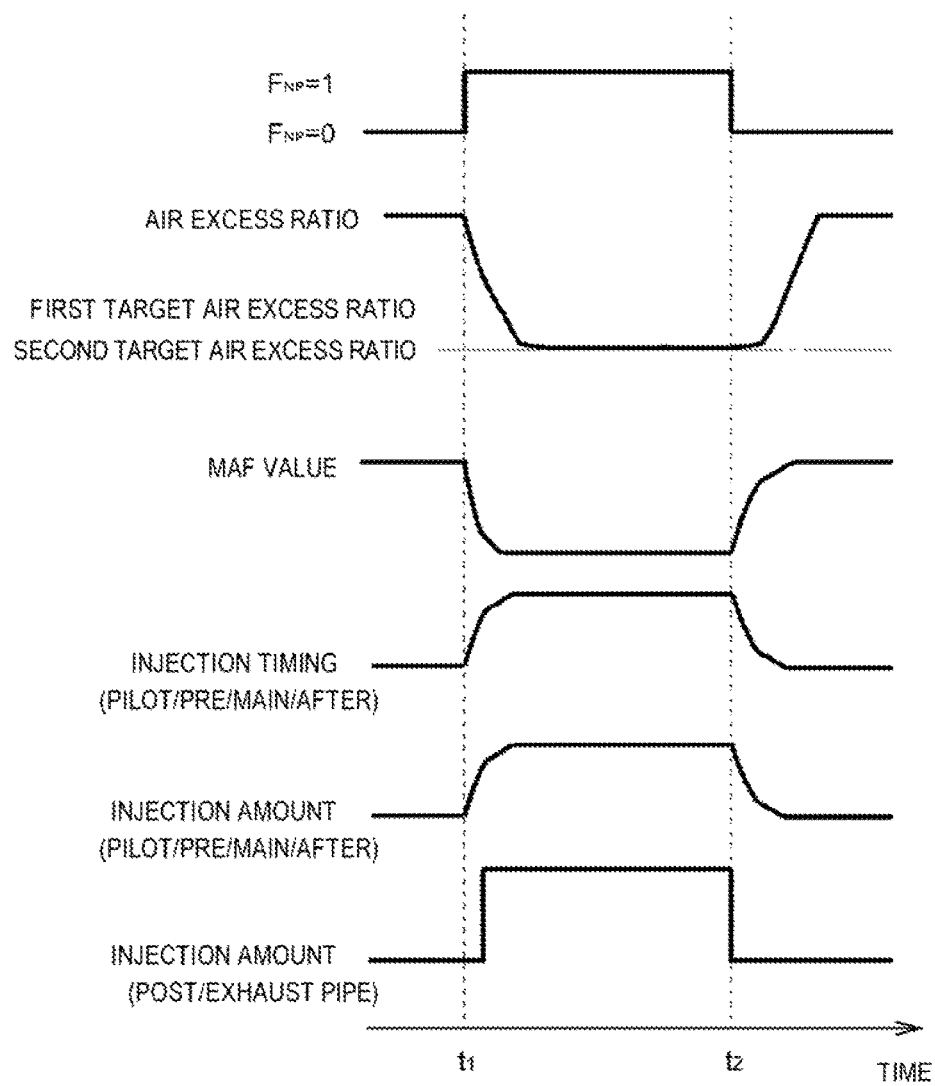
FIG. 2 is a timing chart diagram for illustrating NOx purge control in accordance with the illustrative embodiment.

The MAF target value $MAF_{NPL\_Trgt}$ calculated by the MAF target value calculation unit 62 is input to a ramp processing unit 63 when the NOx purge flag $F_{NP}$ becomes on (refer to time $t_1$ in FIG. 2). The ramp processing unit 63 is configured to read a ramp coefficient from a +ramp coefficient map 63A and a –ramp coefficient map 63B, in response to the engine revolution Ne and the accelerator opening degree Q, which are input signals, and to input an MAF target ramp value $MAF_{NPL\_Trgt\_Ramp}$ to which the ramp coefficient is added to a valve control unit 64.

The valve control unit 64 is configured to execute feedback control of narrowing the intake throttle valve 16 towards a close side and widening the EGR valve 24 towards an open side so that an actual MAF value $MAF_{Act}$ input from the MAF sensor 40 becomes the MAF target ramp value $MAF_{NPL\_Trgt\_Ramp}$.

In this way, in the illustrative embodiment, the MAF target value $MAF_{NPL\_Trgt}$ is set on the basis of the air excess ratio target value $\lambda_{NPL\_Trgt}$, which is to be read from the first target air excess ratio setting map 61, and the fuel injection amount of each in-cylinder injector 11, and the air system operation is controlled in the feedback manner on the basis of the MAF target value $MAF_{NPL\_Trgt}$. Thereby, it is possible to effectively lower the exhaust to a desired air excess ratio necessary for the NOx purge lean control without providing a lambda sensor at an upstream side of the NOx-occlusion-reduction-type catalyst 32 or without using a sensor value of a lambda sensor even when the lambda sensor is provided at the upstream side of the NOx-occlusion-reduction-type catalyst 32.

Also, the fuel injection amount $Q_{fnl\_corrd}$ after the learning correction is used as the fuel injection amount of each in-cylinder injector 11, so that it is possible to set the MAF target value $MAF_{NPL\_Trgt}$ in the feed-forward control manner. Therefore, it is possible to effectively exclude influences such as aging degradation and characteristic change of each in-cylinder injector 11.

Also, the ramp coefficient, which is to be set in correspondence to the operating state of the engine 10, is added to the MAF target value $MAF_{NPL\_Trgt}$, so that it is possible to effectively prevent accident fire of the engine 10 due to a rapid change in the intake air amount, deterioration of drivability due to torque variation, and the like.

[Setting of Fuel Injection Amount in NOx Purge Rich Control]

Figure 4:
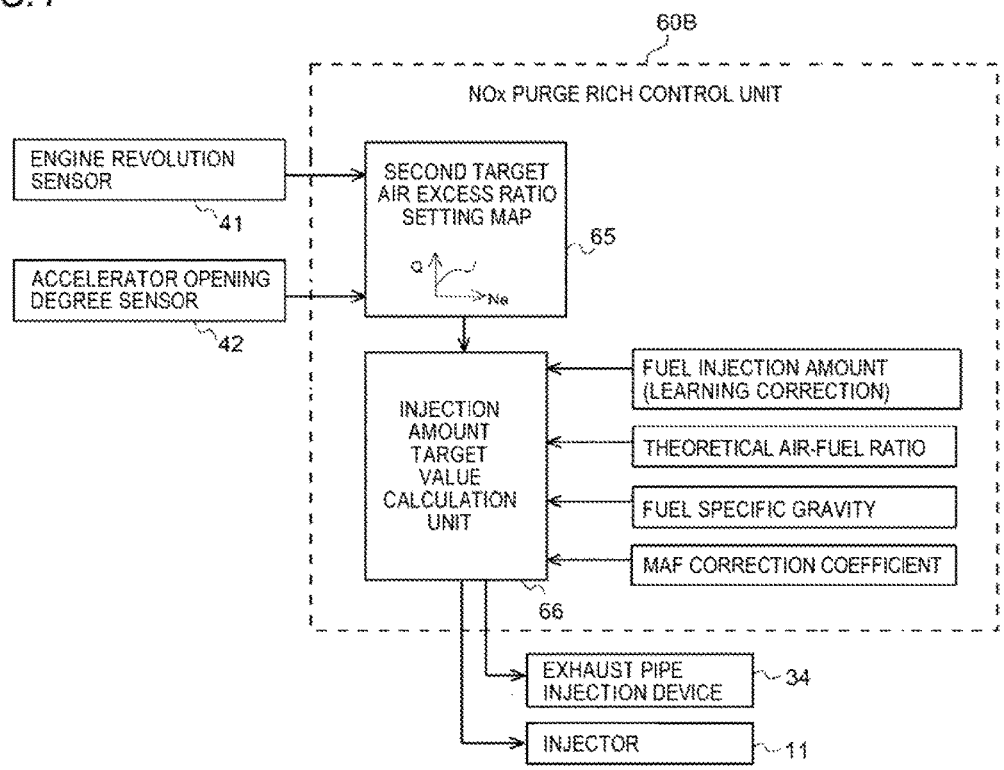
FIG. 4 is a block diagram depicting setting processing of a target injection amount that is to be used for NOx purge rich control in accordance with the illustrative embodiment.

FIG. 4 is a block diagram depicting setting processing of a target injection amount $Q_{NPL\_Trgt}$ (injection amount per unit time) of the exhaust pipe injection or the post injection, which is to be performed by a NOx purge rich control unit 60B. A second target air excess ratio setting map 65 is a map that is to be referred to on the basis of the engine revolution Ne and the accelerator opening degree Q, and an air excess ratio target value $\lambda_{NPL\_Trgt}$ (second target air excess ratio) upon NOx purge rich control corresponding to the engine revolution Ne and the accelerator opening degree Q is set in advance by a test and the like.

First, the air excess ratio target value $\lambda_{NPL\_Trgt}$ upon NOx purge rich control is read from the second target air excess ratio setting map 65, in response to the engine revolution Ne and the accelerator opening degree Q, which are input signals, and is then input to an injection amount target value calculation unit 66. Also, the injection amount target value calculation unit 66 calculates a target injection amount $Q_{NPL\_Trgt}$ upon NOx purge rich control, based on an equation (2).

$$Q_{NPR\_Trgt}=MAF_{NPL\_Trgt} \times Maf\_corr/(\lambda_{NPR\_Trgt} \times Ro_{Fuel} \times AFR_{sto})-Q_{fnl\_corrd} \quad (2)$$

In the equation (2), $MAF_{NPL\_Trgt}$ is input from the MAF target value calculation unit 62, as a NOx purge lean MAF target value. Also, $Q_{fnl\_corrd}$ indicates a learning-corrected fuel injection amount (the post injection is excluded) of the in-cylinder injector 11 before an MAF follow-up control is applied, $Ro_{Fuel}$ indicates a fuel specific gravity, $AFR_{sto}$ indicates a theoretical air-fuel ratio, and $Maf_{corr}$ indicates an MAF correction coefficient (which will he described later).

The target injection amount $Q_{NPR\_Trgt}$ calculated by the injection amount target value calculation unit 66 is transmitted to the exhaust injector 34 or each in-cylinder injector 11, as an injection instruction signal, when the NOx purge flag $F_{NP}$ becomes on (refer to time $t_1$ in FIG. 2). The transmission of the injection instruction signal is continuously performed until the NOx purge flag $F_{NP}$ becomes off (refer to time $t_2$ in FIG. 2) by ending determination of the NOx purge control, which will be described later.

In this way, in the illustrative embodiment, the target injection amount $Q_{NPR\_Trgt}$ is set on the basis of the air excess ratio target value $\lambda_{NPR\_Trgt}$, which is to be read from the second target air excess ratio setting map 65, and the fuel injection amount of each in-cylinder injector 11. Thereby, it is possible to effectively lower the exhaust to a desired air excess ratio necessary for the NOx purge rich control without providing a lambda sensor at the upstream side of the NOx-occlusion-reduction-type catalyst 32 or without using a sensor value of a lambda sensor even when the lambda sensor is provided at the upstream side of the NOx-occlusion-reduction-type catalyst 32.

Also, the fuel injection amount $Q_{fnl\_corrd}$ after the learning correction is used as the fuel injection amount of each in-cylinder injector 11, so that it is possible to set the target injection amount $Q_{NPr\_Trgt}$ in the feed-forward control manner. Therefore, it is possible to effectively exclude influences such as aging degradation and characteristic change of each in-cylinder injector 11.

[Prohibition Processing of NOx Purge Control]

Figure 5:
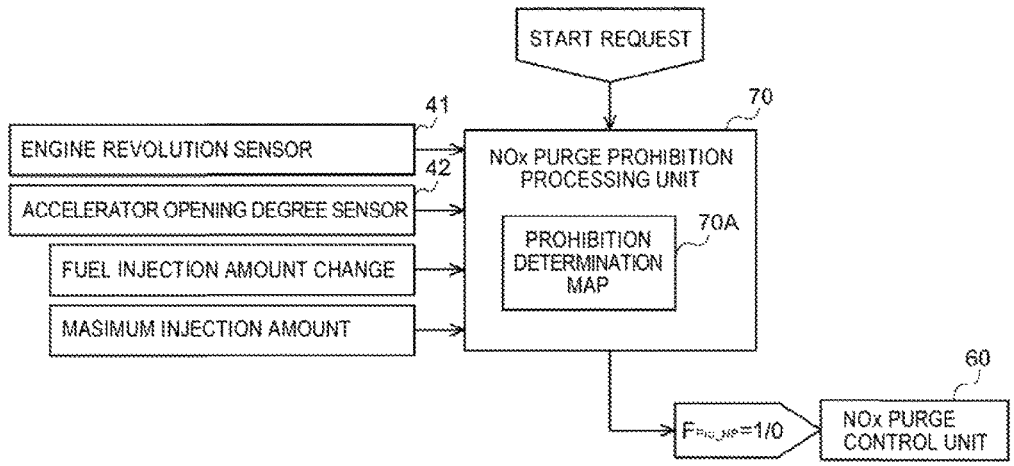
FIG. 5 is a block diagram depicting prohibition processing of NOx purge control in accordance with the illustrative embodiment.

FIG. 5 is a block diagram depicting prohibition processing that is to be performed by the NOx purge prohibition processing unit 70. The NOx purge prohibition processing unit 70 is an example of the prohibition means of the disclosure and is configured to prohibit execution of the NOx purge control by setting the NOx purge prohibition flag $F_{Pro\_NP}$ to an on-state ($F_{Pro\_NP}=1$) if any one of following general prohibition conditions (A1) to (A10) is fulfilled.

(A1) The engine revolution Ne is greater than a predetermined upper limit revolution threshold value $Ne\_{max}$.

(A2) The engine revolution Ne is smaller than a predetermined lower limit revolution threshold value $Ne\_{min}$.

(A3) The fuel injection amount $Q_{fnl\_corrd}$ (the post injection is excluded) of the in-cylinder injector 11 is greater than a predetermined upper limit injection amount threshold value $Q\_{max}$.

(A4) The fuel injection amount $Q_{fnl\_corrd}$ (the post injection is excluded) of the in-cylinder injector 11 is smaller than a predetermined lower limit injection amount threshold value $Q\_{min}$.

(A5) The engine 10 is in a predetermined high-load operating state and boot pressure feedback control (open loop control, in the case of the air system) is executed.

(A6) There is a possibility that the engine 10 is in a motoring state (a state where the engine rotates with the fuel injection being stopped) of stopping fuel injection immediately after NOx purge control starts.

(A7) An estimated reachable exhaust air excess ratio value $\lambda_{est\_max}$, which is estimated from a maximum limit injection amount $Q_{exh\_max}$ of the exhaust injector 34, is greater than an air excess ratio target value $\lambda_{NPR\_Trgt}$ (second target air excess ratio), which is set by the NOx purge rich control unit 60B.

(A8) A catalyst temperature of the NOx-occlusion-reduction-type catalyst 32 is lower than a predetermined catalyst activation temperature.

(A9) An abnormality occurs in a main sensor such as the NOx/lambda sensor 45.

(A10) A system error occurs.

In the below, the general prohibition conditions are described in detail. Herein, the general prohibition conditions (A1) to (A8) are described, and the descriptions of the general prohibition conditions (A9) and (A10) are omitted.

Figure 6:
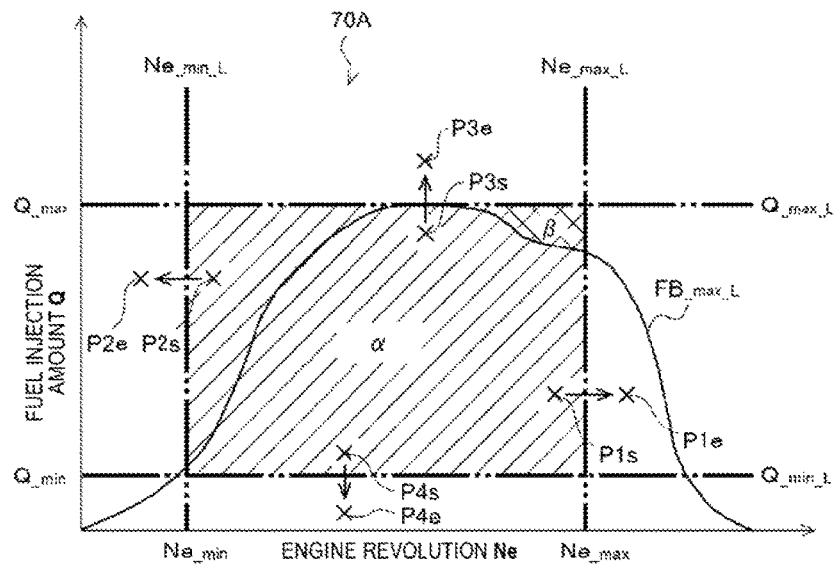
FIG. 6 depicts an example of a prohibition determination map in accordance with the illustrative embodiment.

The general prohibition conditions (A1) to (A4) are determined on the basis of a prohibition determination map 70A. As shown in FIG. 6, the prohibition determination map 70A is a two-dimensional map that is to be referred to on the basis of the engine revolution Ne and the fuel injection amount Q (accelerator opening degree), and an upper limit revolution threshold value line $Ne\_{max\_L}$, a lower limit revolution threshold value line $Ne\_{min\_L}$, an upper limit injection amount threshold value line $Q\_{max\_L}$, and a lower limit injection amount threshold value line $Q\_{min\_L}$, which are acquired in advance by a test and the like, are set as fixed values (constant values). That is, a substantially rectangular region surrounded by the four upper and lower limit lines is set as a NOx purge permission region α. When the engine revolution Ne and the fuel injection amount Q deviate from the NOx purge permission region α, the execution of NOx purge control is prohibited.

In this way, in the illustrative embodiment, when the engine revolution Ne is greater than the upper limit revolution threshold value $Ne\_{max}$ or when the fuel injection amount of the in-cylinder injector 11 is greater than the upper limit injection amount threshold value $Q\_{max}$, the execution of NOx purge control is prohibited, so that it is possible to effectively prevent a temperature of the engine from rapidly increasing. Also, when the engine revolution Ne is smaller than the lower limit revolution threshold value $Ne\_{min}$, the execution of NOx purge control is prohibited, so that it is possible to effectively prevent an increase in HC slip. Also, when the fuel injection amount of the in-cylinder injector 11 is smaller than the lower limit injection amount threshold value $Q\_{min}$, the execution of NOx purge control is prohibited, so that it is possible to securely suppress the useless execution of NOx purge control at a state where the exhaust lambda is difficult to be lowered. Thereby, it is possible to effectively prevent the deterioration in fuel consumption.

The general prohibition condition (A5) is also determined on the basis of the prohibition determination map 70A, like the general prohibition conditions (A1) to (A4). As shown in FIG. 6, in the prohibition determination map 70A, a boost pressure feedback control line $FB\_{max\_L}$ is further set, in addition to the four upper and lower limit lines. In a region where the fuel injection amount Q is higher than the boost pressure feedback control line $FB\_{max\_L}$, boost pressure feedback control (open loop control, in the case of the air system) of controlling an opening degree of the variable capacity-type supercharger 20 on the basis of a sensor value of a boost pressure sensor 46 in a feedback manner is executed.

The boost pressure feedback control line $FB\_{max\_L}$ is set at a high revolution-side of the engine so that the fuel injection amount Q gradually decreases as the engine revolution Ne increases, and at least part thereof is included in a high load region in the NOx purge permission region α. That is, a β region in which the boost pressure feedback control is to be executed is set in the NOx purge permission region α where the fuel injection amount Q is equal to or smaller than the upper limit injection amount threshold value $Q\_{max}$. If the NOx purge control is executed in the region β, the air system controls interfere with each other and an actual MAF cannot be matched with a target MAF value, so that an exhaust enriching injection amount may be inappropriate.

In the illustrative embodiment, the region β where the actual MAF and the target MAF value are not matched is set as a prohibition region of the NOx purge control, so that it is possible to securely prevent the deterioration in fuel consumption and the excessive increase in temperature of the exhaust, which are caused when the exhaust enriching injection amount is inappropriate.

The general prohibition condition (A6) is determined on the basis of a change in the fuel injection amount of the in-cylinder injector 11 when "start request" of the NOx purge control is established. More specifically, when "start request" of the NOx purge control is established, if a conditional equation (3) where a total sum of the fuel injection amount $Q_{fnl\_corrd}$ of the in-cylinder injector 11 and a value obtained by multiplying an injection amount derivative value ΔQ by a predetermined time constant K is smaller than zero (0) (a negative value) is fulfilled, it is determined that the engine 10 is to be in the motoring state in a short time, and the NOx purge control is thus prohibited.

$$Q_{fnl\_corrd} - \Delta Q \times K < 0 \quad (3)$$

In this way, when there is a possibility that the engine 10 is to be in the motoring state immediately after the NOx purge control starts, the execution of NOx purge control is prohibited, so that it is possible to effectively prevent the useless fuel consumption.

The general prohibition condition (A7) is determined on the basis of a maximum limit injection amount $Q_{exh\_max}$ of the exhaust injector 34, which is stored in advance in the memory of the ECU 50. More specifically, when "start request" of the NOx purge control is established, an estimated reachable exhaust air excess ratio value $\lambda_{est\_max}$ when the NOx purge control is executed is calculated on the basis of the maximum limit injection amount $Q_{exh\_max}$ of the exhaust injector 34, and if the estimated exhaust air excess ratio value $\lambda_{est\_max}$ is greater than the air excess ratio target value $\lambda_{NPR\_Trgt}$ (second target air excess ratio) of the NOx purge rich control ($\lambda_{est\_max} > \lambda_{NPR\_Trgt}$), the execution of NOx purge control is prohibited.

In this way, when it is not possible to lower the exhaust to the desired air excess ratio by limiting the maximum limit injection amount $Q_{exh\_max}$ of the exhaust injector 34 even though the NOx purge control is executed, the execution of NOx purge control is prohibited, so that it is possible to effectively prevent the useless fuel consumption.

The general prohibition condition (A8) is determined on the basis of an estimated catalyst temperature of the NOx-occlusion-reduction-type catalyst 33. The estimated catalyst temperature is estimated on the basis of an inlet temperature of the oxidation sensor 31, which is detected at the first exhaust temperature sensor 43, exothermal reactions in the oxidation sensor 31 and the NOx-occlusion-reduction-type catalyst 32, and the like, for example, and when the estimated catalyst temperature is lower than a predetermined catalyst activation temperature, the NOx purge control is prohibited.

In this way, when the catalyst temperature of the NOx-occlusion-reduction-type catalyst 32 is lower than the catalyst activation temperature, the NOx purge is prohibited, so that it is possible to effectively prevent white smoke and the like.

[Continuing Processing in NOx Purge Control]

The NOx purge prohibition processing unit 70 is an example of the continuing means of the disclosure and continues to execute the NOx purge control with keeping the NOx purge prohibition flag $F_{Pro\_NP}$ at the off-state ($F_{Pro\_NP}=0$) when any one of specific prohibition conditions (B1) to (B5) is fulfilled during the execution of NOx purge control. In other words, the NOx purge prohibition processing unit invalidates the prohibition means and continues to execute the NOx purge control.

(B1) The engine revolution Ne becomes greater than the predetermined upper limit revolution threshold value $Ne\_{max}$.

(B2) The engine revolution Ne becomes smaller than the predetermined lower limit revolution threshold value $Ne\_{min}$.

(B3) The fuel injection amount $Q_{fnl\_corrd}$ (the post injection is excluded) of the in-cylinder injector 11 becomes greater than the predetermined upper limit injection amount threshold value $Q\_{max}$.

(B4) The fuel injection amount $Q_{fnl\_corrd}$ (the post injection is excluded) of the in-cylinder injector 11 becomes smaller than the predetermined lower limit injection amount threshold value $Q\_{min}$.

(B5) The catalyst temperature of the NOx-occlusion-reduction-type catalyst 32 becomes lower than the catalyst activation temperature.

The specific prohibition conditions (B1) to (B5) are parts of the general prohibition conditions (A1) to (A10). Specifically, the specific prohibition conditions (B1) to (B4) are equivalent to the general prohibition conditions (A1) to (A4) and the specific prohibition condition (B5) is equivalent to the general prohibition condition (A8).

In the below, the specific prohibition conditions (B1) to (B5) are described in detail. First, the specific prohibition conditions (B1) to (B4) are described with reference to the prohibition determination map 70A shown in FIG. 6.

The specific prohibition condition (B1) is a case where the operating state of the engine 10 changes from a state denoted with a reference numeral P1s to a state denoted with a reference numeral P1e, for example. In this example, since the operating state of the engine 10 (the fuel injection amount Q, the engine revolution Ne) is at the position P1s in the NOx purge permission region α at a point of time at which the start request of the NOx purge control is issued, the NOx purge control is started. However, during the execution of NOx purge, the engine revolution Ne increases beyond the upper limit revolution threshold value line $Ne\_{max\_L}$ and reaches the position P1e.

The NOx purge prohibition processing unit 70 determines that the general prohibition condition (A1) has been fulfilled because the engine revolution Ne crosses the upper limit revolution threshold value line $Ne\_{max\_L}$. However, since the specific prohibition condition (B1) is also fulfilled, the NOx purge prohibition processing unit invalidates the general prohibition condition (A1) and continues to execute the NOx purge control. The reason is as follows. Since the fuel injection is performed in a short time during the NOx purge control, even though the engine revolution Ne crosses the upper limit revolution threshold value line $Ne\_{max\_L}$, a difference from the upper limit revolution threshold value $Ne\_{max}$ is small and the short-time fuel injection does not cause a problem, so that it is advantageous to reduce and purify NOx by continuing the NOx purge control.

The specific prohibition condition (B2) is a case where the operating state of the engine 10 changes from a state denoted with a reference numeral P2s to a state denoted with a reference numeral P2e, for example. In this example, since the operating state of the engine 10 (the fuel injection amount Q, the engine revolution Ne) is at the position P2s in the NOx purge permission region α at a point of time at which the start request of the NOx purge control is issued, the NOx purge control is started. However, during the execution of NOx purge, the engine revolution Ne decreases beyond the lower limit revolution threshold value Ne_$min$ and reaches the position P2e.

The NOx purge prohibition processing unit 70 determines that the general prohibition condition (A2) has been fulfilled because the engine revolution Ne crosses the lower limit revolution threshold value Ne_$min$. However, since the specific prohibition condition (B2) is also fulfilled, the NOx purge prohibition processing unit invalidates the general prohibition condition (A2) and continues to execute the NOx purge control. The reason is as follows. Since the fuel injection is performed in a short time during the NOx purge control, even though the engine revolution Ne crosses the lower limit revolution threshold value Ne_$min$, difference from the lower limit revolution threshold value Ne_$min$ is small and the short-time fuel injection does not cause a problem, so that it is advantageous to continue the NOx purge control.

The specific prohibition condition (B3) is a case where the operating state of the engine 10 changes from a state denoted with a reference numeral P3s to a state denoted with a reference numeral P3e, for example. In this example, since the operating state of the engine 10 (the fuel injection amount Q, the engine revolution Ne) is at the position P3s in the NOx purge permission region α at a point of time at which the start request of the NOx purge control is issued, the NOx purge control is started. However, during the execution of NOx purge, the fuel injection amount Q increases beyond the upper limit injection amount threshold value line Q_$max\_L$ and reaches the position P3e.

The NOx purge prohibition processing unit 70 determines that the general prohibition condition (A3) has been fulfilled because the fuel injection amount Q crosses the upper limit injection amount threshold value line Q_$max\_L$. However, since the specific prohibition condition (B3) is also fulfilled, the NOx purge prohibition processing unit invalidates the general prohibition condition (A3) and continues to execute the NOx purge control. The reason is as follows. Since the fuel injection is performed in a short time during the NOx purge control, even though the fuel injection amount Q crosses the upper limit injection amount threshold value line Q_$max\_L$, a difference from the upper limit injection amount threshold value line Q_$max\_L$ is small and the short-time fuel injection does not cause a problem, so that it is advantageous to continue the NOx purge control.

The specific prohibition condition (B4) is a case where the operating state of the engine 10 changes from a state denoted with a reference numeral P4s to a state denoted with a reference numeral P4e, for example. In this example, since the operating state of the engine 10 (the fuel injection amount Q, the engine revolution Ne) is at the position P4s in the NOx purge permission region a at a point of time at which the start request of the NOx purge control is issued, the NOx purge control is started. However, during the execution of NOx purge, the fuel injection amount Q decreases beyond the lower limit injection amount threshold value line Q_$min\_L$ and reaches the position P4e.

The NOx purge prohibition processing unit 70 determines that the general prohibition condition (A4) has been fulfilled because the fuel injection amount Q crosses the lower limit injection amount threshold value line Q_$min\_L$. However, since the specific prohibition condition (B4) is also fulfilled, the NOx purge prohibition processing unit invalidates the general prohibition condition (A4) and continues to execute the NOx purge control. The reason is as follows. Since the fuel injection is performed in a short time during the NOx purge control, even though the fuel injection amount Q crosses the lower limit injection amount threshold value line Q_$min\_L$, a difference from the lower limit injection amount threshold value line Q_$min\_L$ is small and the short-time fuel injection does not cause a problem, so that it is advantageous to continue the NOx purge control.

The specific prohibition condition (B5) relates to the estimated catalyst temperature of the NOx-occlusion-reduction-type catalyst 32, for example, and is a case where since the temperature is equal to or higher than a predetermined catalyst activation temperature at a point of time at which the start request of the NOx purge control is issued, the NOx purge control is started but the temperature becomes lower than the catalyst activation temperature during the execution of NOx purge.

The NOx purge prohibition processing unit 70 determines that the general prohibition condition (A8) has been fulfilled because the estimated catalyst temperature of the NOx-occlusion-reduction-type catalyst 32 becomes lower than the catalyst activation temperature. However, since the specific prohibition condition (B5) is also fulfilled, the NOx purge prohibition processing unit invalidates the general prohibition condition (A8) and continues to execute the NOx purge control. The reason is as follows. Since the fuel injection is performed in a short time during the NOx purge control, even though the estimated catalyst temperature becomes lower than the catalyst activation temperature, a difference from the catalyst activation temperature is small and the short-time fuel injection does not cause a problem, so that it is advantageous to continue the NOx purge control.

In the illustrative embodiment, parts of the general prohibition conditions (A1) to (A10) are set as the specific prohibition conditions (B1) to (B5), and when the specific prohibition condition is fulfilled during the execution of NOx purge control, the NOx purge prohibition processing unit 70 invalidates the general prohibition condition and continues to execute the NOx purge control. As a result, the exhaust pipe injection or the post injection, which has been performed until then, does not come to nothing, so that it is possible to effectively prevent the deterioration in fuel consumption.

[Ending Determination of NOx Purge Control]

When any one of conditions that (1) the injection amounts of the exhaust pipe injection or the post injection are cumulated from the on-state of the NOx purge flag $F_{NP}$ and the cumulated injection amount reaches a predetermined upper limit threshold value amount, (2) the elapse time measured from the start of the NOx purge control reaches predetermined upper limit threshold value time and (3) a NOx occlusion amount of the NOx-occlusion-reduction-type catalyst 32, which is calculated on the basis of a predetermined model equation including, as input signals, an operating state of the engine 10, a sensor value of the NOx/lambda sensor 45 and the like, is lowered to a predetermined threshold value indicative of NOx removal success is satisfied, the NOx purge flag $F_{NP}$ is set to an off-state and the NOx purge control is over (refer to time $t_2$ in FIG. 2).

In this way, in the illustrative embodiment, the upper limits of the cumulated injection amount and the elapse time are provided with respect to the ending conditions of the NOx purge control, so that it is possible to securely prevent the fuel from being excessively consumed when the NOx purge fails due to the decrease in the exhaust temperature and the like.

[MAF Follow-Up Control]

The MAF follow-up control unit 80 is configured to execute MAF follow-up control of correcting a fuel injection timing and a fuel injection amount of each in-cylinder injector 11 in correspondence to MAF change (1) for a switching time period from a lean state of normal operation to a rich state by the NOx purge control and (2) for a switching time period from the rich state by the NOx purge control to the lean state of normal operation.

[Injection Amount Learning Correction]

Figure 7:
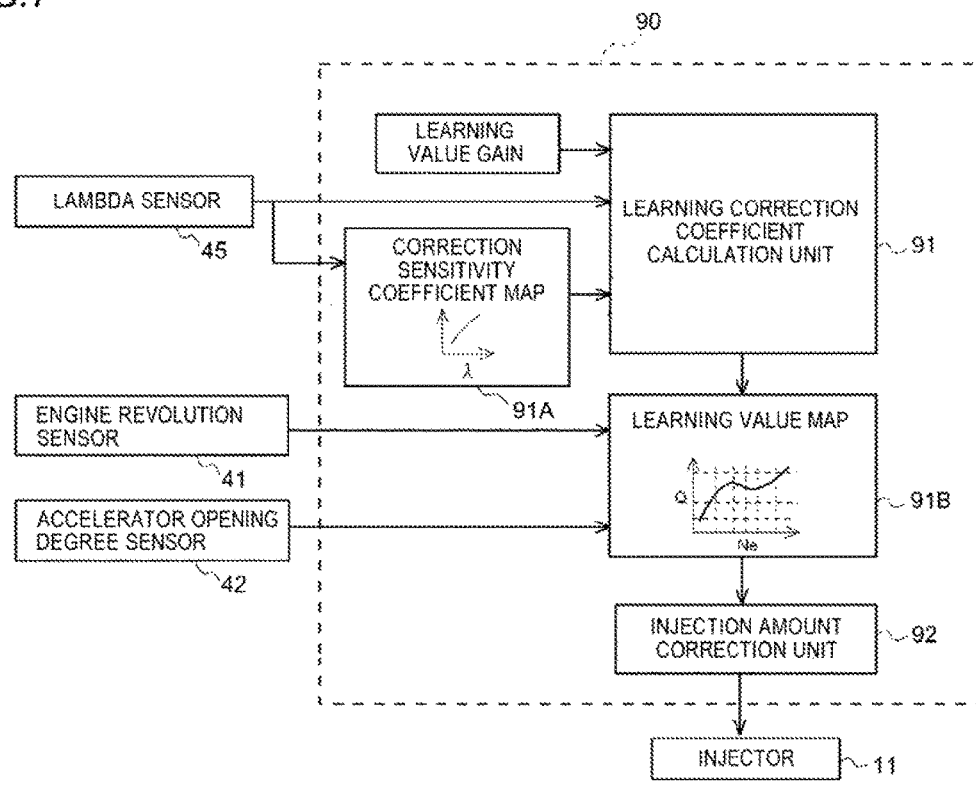
FIG. 7 is a block diagram depicting injection amount learning correction processing of an in-cylinder injector in accordance with the illustrative embodiment.

As shown in FIG. 7, the injection amount learning correction unit 90 includes a learning correction coefficient calculation unit 91 and an injection amount correction unit 92.

Figure 8:
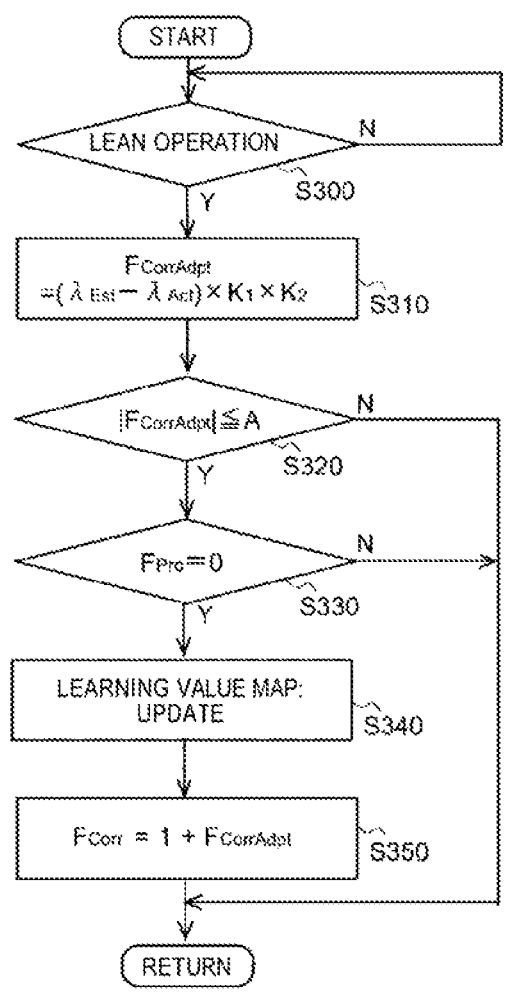
FIG. 8 is a flowchart depicting learning correction coefficient calculation processing in accordance with the illustrative embodiment.

The learning correction coefficient calculation unit 91 is configured to calculate a learning correction coefficient $F_{Corr}$ of the fuel injection amount, based on an error $\Delta\lambda$ between an actual lambda value $\lambda_{Act}$, which is to be detected by the NOx/lambda sensor 45 upon lean operation of the engine 10, and an estimated lambda value $\lambda_{Est}$. When the exhaust is in the lean state, an HC concentration in the exhaust is very small, so that a change in exhaust lambda value due to an oxidation reaction of HC in the oxidation catalyst 31 is negligible small. For this reason, it is thought that the actual lambda value $\lambda_{Act}$ in the exhaust, which passes through the oxidation catalyst 31 and is detected by the downstream-side NOx/lambda sensor 45, coincides with the estimated lambda value $\lambda_{Est}$ in the exhaust emitted from the engine 10. That is, when the error $\Delta\lambda$ occurs between the actual lambda value $\lambda_{Act}$ and the estimated lambda value $\lambda_{Est}$, it can be assumed that the error is caused due to a difference between an instructed injection amount to each in-cylinder injector 11 and an actual injection amount. In the below, learning correction coefficient calculation processing, which is to be performed using the error $\Delta\lambda$ by the learning correction coefficient calculation unit 91, is described with reference to a flowchart of FIG. 8.

In step S300, it is determined whether the engine 10 is in a lean operating state, based on the engine revolution Ne and the accelerator opening degree Q. When it is determined that the engine is in the lean operating state, the learning correction coefficient calculation unit proceeds to step S310 so as to start learning correction coefficient calculation.

In step S310, a learning value $F_{CorrAdpt}$ is calculated ($F_{CorrAdpt}=(\lambda_{Est}-\lambda_{Act})\times K_1 \times K_2$) by multiplying the error $\Delta\lambda$, which is obtained by subtracting the actual lambda value $\lambda_{Act}$ detected at the NOx/lambda sensor 45 from the estimated lambda value $\lambda_{Est}$, by a learning value gain $K_1$ and a correction sensitivity coefficient $K_2$. The estimated lambda value $\lambda_{Est}$ is estimated and calculated from the operating state of the engine 10 corresponding to the engine revolution Ne and the accelerator opening degree Q. Also, the correction sensitivity coefficient $K_2$ is read from a correction sensitivity coefficient map 91A shown in FIG. 7, in response to the actual lambda value $\lambda_{Act}$ detected at the NOx/lambda sensor 45, which is an input signal.

In step S320, it is determined whether an absolute value $|F_{CorrAdpt}|$ of the learning value $F_{CorrAdpt}$ is within a range of a predetermined correction limit value A. When it is determined that the absolute value $|F_{CorrAdpt}|$ exceeds the correction limit value A, the control returns and this learning is stopped, In step S330, it is determined whether a learning prohibition flag $F_{Pro}$ is off. As the learning prohibition flag $F_{Pro}$, for example, a transient operation of the engine 10, the NOx purge control ($F_{NP}=1$) and the like are exemplified. The reason is that when the corresponding conditions are satisfied, the error $\Delta\lambda$ increases due to a change in the actual lambda value $\lambda_{Act}$, so that the correct learning cannot be performed. Regarding the determination as to whether the engine 10 is in the transient operation, based on a temporal change amount of the actual lambda value $\lambda_{Act}$ detected at the NOx/lambda sensor 45, when the temporal change amount is greater than a predetermined threshold value, it may be determined that the engine is in the transient operation.

In step S340, a learning value map 91B (refer to FIG. 7), which is referred to on the basis of the engine revolution Ne and the accelerator opening degree Q, is updated to the learning value $F_{CorrAdpt}$ calculated in step S310. More specifically, in the learning value map 91B, a plurality of learning regions divided in correspondence to the engine revolution Ne and the accelerator opening degree Q is set. The learning regions are preferably set to be narrower as use frequencies thereof are higher and to be wider as use frequencies thereof are lower. Thereby, the learning accuracy is improved in the region of which use frequency is high and it is possible to effectively prevent the non-learning in the region of which use frequency is low.

In step S350, in response to the engine revolution Ne and the accelerator opening degree Q, which are input signals, "1" is added to the learning value read from the learning value map 91B, so that a learning correction coefficient $F_{Corr}$ is calculated ($F_{Corr}=1+F_{CorrAdpt}$). The learning correction coefficient $F_{Corr}$ is input to the injection amount correction unit 92 shown in FIG. 7.

The injection amount correction unit 92 multiplies respective basic injection amounts of pilot injection $Q_{Pilot}$, pre-injection $Q_{Pre}$, main injection $Q_{Main}$, after-injection $Q_{After}$ and post injection $Q_{Post}$ by the learning correction coefficient $F_{Corr}$, thereby correcting the fuel injection amounts.

In this way, the fuel injection amount to each in-cylinder injector 11 is corrected by the learning value corresponding to the error $\Delta\lambda$ between the estimated lambda value $\lambda_{Est}$ and the actual lambda value $\lambda_{Act}$, so that it is possible to effectively exclude the non-uniformity such as aging degradation, characteristic change, individual difference and the like of each in-cylinder injector 11.

[MAF Correction Coefficient]

The MAF correction coefficient calculation unit 95 is configured to calculate an MAF correction coefficient Maf_corr, which is to be used for the setting of the MAF target value $MAF_{NPL\_Trgt}$ and the target injection amount $Q_{NPR\_Trgt}$ upon the NOx purge control.

In the illustrative embodiment, the fuel injection amount of each in-cylinder injector 11 is corrected on the basis of the error $\Delta\lambda$ between the actual lambda value $\lambda_{Act}$ detected at the NOx/lambda sensor 45 and the estimated lambda value $\lambda_{Est}$. However, since the lambda is a ratio of air and fuel, it cannot be said that the error $\Delta\lambda$ is necessarily caused due to the difference between the instructed injection amount to each in-cylinder injector 11 and the actual injection amount. That is, the error $\Delta\lambda$ of the lambda may be influenced not only by each in-cylinder injector 11 but also an error of the MAF sensor 40.

Figure 9:
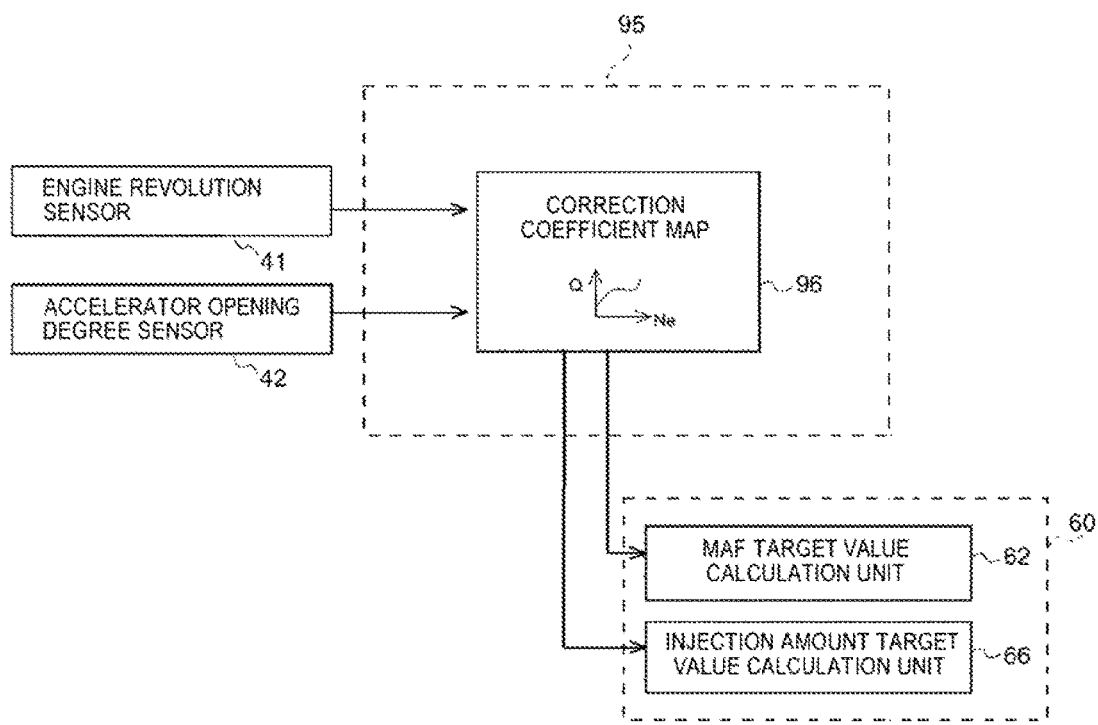
FIG. 9 is a block diagram depicting MAF correction coefficient setting processing in accordance with the illustrative embodiment.

FIG. 9 is a block diagram depicting setting processing of the MAF correction coefficient Maf_corr, which is to be performed by the MAF correction coefficient calculation unit 95. A correction coefficient setting map 96 is a map that is to be referred to on the basis of the engine revolution Ne and the accelerator opening degree Q, and an MAF correction coefficient Maf_corr indicative of a sensor characteristic of the MAF sensor 40 corresponding to the engine revolution Ne and the accelerator opening degree Q is set in advance by a test and the like.

The MAF correction coefficient calculation unit 95 is configured to read the MAF correction coefficient $Maf\_{corr}$ from the correction coefficient setting map 96, in response to the engine revolution Ne and the accelerator opening degree Q, which are input signals, and to transmit the MAF correction coefficient $Maf\_{corr}$ to the MAF target value calculation unit 62 and the injection amount target value calculation unit 66. Thereby, it is possible to effectively reflect the sensor characteristics of the MAF sensor 40 when setting the MAF target value $MAF_{NPL\_Trgt}$ and the target injection amount $Q_{NPR\_Trgt}$ upon the NOx purge control.

[Others]

In the meantime, the present invention is not limited to the above embodiment and can be implemented with being appropriately modified without departing from the gist of the present invention.

The subject application is based on a Japanese Patent Application No. 2015-048307 filed on Mar. 11, 2015, the entire contents of which are incorporated herein by reference.

INDUSTRIAL APPLICABILITY

The exhaust purification system and the control method of an exhaust purification system of the present invention has the effect of effectively preventing the deterioration in fuel consumption by regulating the execution and prohibition of NOx purge, and is useful in that it is possible to effectively prevent the deterioration in fuel consumption by regulating the execution and prohibition of NOx purge.

DESCRIPTION OF REFERENCE NUMERALS

10: engine
11: in-cylinder injector
12: intake passage
13: exhaust passage
16: intake throttle valve
24: EGR valve
31: oxidation catalyst
32: NOx-occlusion-reduction-type catalyst
33: filter
34: exhaust injector
40: MAF sensor
45: NOx/lambda sensor
50: ECU

The invention claimed is:

1. An exhaust purification system comprising:
   a NOx-occlusion-reduction-type catalyst that is provided in an exhaust system of an internal combustion engine and occludes NOx in exhaust flowing in the exhaust system when the exhaust is in a lean state and reduces and purifies the occluded NOx when the exhaust is in a rich state; and
   a controller configured to execute:
   a catalyst regeneration processing executing process for executing catalyst regeneration processing of enriching the exhaust and reducing and purifying the NOx occluded in the NOx-occlusion-reduction-type catalyst;
   a prohibition process for, when at least one of a plurality of prohibition conditions is fulfilled, prohibiting execution of the catalyst regeneration processing by the catalyst regeneration process even when a catalyst regeneration processing start request is issued, and
   a continuing process for, when a specific prohibition condition, which is a part of the plurality of prohibition conditions, is fulfilled during the execution of the catalyst regeneration processing, continuing the catalyst regeneration processing by the catalyst regeneration process without executing the prohibition process, by invalidating the prohibition process.

2. The exhaust purification system according to claim 1, wherein
   when a fuel injection amount of the internal combustion engine is smaller than a predetermined lower limit injection amount threshold value, the prohibition process prohibits the execution of the catalyst regeneration processing by the catalyst regeneration process even though the catalyst regeneration processing start request is issued, and
   process invalidates the prohibition process and continues to execute the catalyst regeneration processing by the catalyst regeneration process.

3. The exhaust purification system according to claim 1, wherein
   when a fuel injection amount of the internal combustion engine is greater than a predetermined upper limit injection amount threshold value, the prohibition process prohibits the execution of the catalyst regeneration processing by the catalyst regeneration processing executing process even though the catalyst regeneration processing start request is issued, and
   process invalidates the prohibition process and continues to execute the catalyst regeneration processing by the catalyst regeneration processing executing process.

4. The exhaust purification system according to claim 1, wherein
   when a revolution of the internal combustion engine is smaller than a predetermined lower limit revolution threshold value, the prohibition process prohibits the execution of the catalyst regeneration processing by the catalyst regeneration processing executing process even though the catalyst regeneration processing start request is issued, and
   when the revolution of the internal combustion engine becomes smaller than the lower limit revolution threshold value during the execution of the catalyst regeneration processing, the continuing process invalidates the prohibition process and continues to execute the catalyst regeneration processing by the catalyst regeneration processing executing process.

5. The exhaust purification system according to claim 1, wherein
   when a revolution of the internal combustion engine is greater than a predetermined upper limit revolution threshold value, the prohibition process prohibits the execution of the catalyst regeneration processing by the catalyst regeneration processing executing process even though the catalyst regeneration processing start request is issued, and
   when the revolution of the internal combustion engine becomes greater than the upper limit revolution threshold value during the execution of the catalyst regeneration processing, the continuing process invalidates the prohibition process and continues to execute the catalyst regeneration processing by the catalyst regeneration processing executing process.

6. The exhaust purification system according to claim 1, wherein the prohibition conditions comprise at least one of:

a case where a revolution of the internal combustion engine is greater than a predetermined upper limit revolution threshold value, a case where the revolution of the internal combustion engine is smaller than a predetermined lower limit revolution threshold value, a case where a fuel injection amount of the internal combustion engine is greater than a predetermined upper limit injection amount threshold value, a case where the fuel injection amount of the internal combustion engine is smaller than a predetermined lower limit injection amount threshold value, a case where the internal combustion engine is in a predetermined high-load operating state and boost pressure feedback control is executed, a case where there is a possibility that the internal combustion engine is in a motoring state of stopping fuel injection immediately after the catalyst regeneration control starts, a case where an estimated reachable exhaust air excess ratio value, which is estimated from a maximum limit injection amount of an exhaust injector provided in the exhaust system and configured to inject fuel, is greater than a predetermined target value, a case where a catalyst temperature of the NOx-occlusion-reduction-type catalyst is lower than a predetermined catalyst activation temperature, a case where an abnormality occurs in a sensor provided in the exhaust purification system, and a case where an error occurs in the exhaust purification system.

7. A control method of an exhaust purification system comprising a NOx-occlusion-reduction-type catalyst that is provided in an exhaust system of an internal combustion engine and occludes NOx in exhaust flowing in the exhaust system when the exhaust is in a lean state and reduces and purifies the occluded NOx when the exhaust is in a rich state, the control method comprising:

catalyst regeneration processing of enriching the exhaust and reducing and purifying the NOx occluded in the NOx-occlusion-reduction-type catalyst, prohibition processing of, when at least one of a plurality of prohibition conditions is fulfilled, prohibiting execution of the catalyst regeneration processing even though a catalyst regeneration processing start request is issued, and continuing processing of, when a specific prohibition condition, which is a part of the plurality of prohibition conditions, is fulfilled during the execution of the catalyst regeneration processing, continuing the catalyst regeneration processing, without executing the prohibition processing, by invalidating the prohibition processing.

* * * * *